(12) United States Patent
Takobe

(10) Patent No.: US 12,494,712 B2
(45) Date of Patent: Dec. 9, 2025

(54) CONTROL CIRCUIT, SWITCHED CAPACITOR CONVERTER, AND VEHICLE

(71) Applicant: ROHM Co., LTD., Kyoto (JP)

(72) Inventor: Isao Takobe, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 287 days.

(21) Appl. No.: 18/314,367

(22) Filed: May 9, 2023

(65) Prior Publication Data

US 2023/0369971 A1 Nov. 16, 2023

(30) Foreign Application Priority Data

May 11, 2022 (JP) ................................ 2022-078100

(51) Int. Cl.
*H02M 3/07* (2006.01)

(52) U.S. Cl.
CPC ..................................... *H02M 3/07* (2013.01)

(58) Field of Classification Search
CPC .... H02M 3/07–073; H02M 7/06; H02M 7/10; H02M 7/19; H02M 7/25; H02M 3/158; H02M 3/1584; H02M 3/155; H02M 3/156; H02M 3/28; H02M 3/33584; H02M 3/33507; H02M 1/32; H02M 1/0006; H02M 1/08; G11C 5/145

See application file for complete search history.

(56) References Cited

U.S. PATENT DOCUMENTS

| | | | |
|---|---|---|---|
| 2008/0054991 A1* | 3/2008 | Maejima | H02M 3/07 327/536 |
| 2018/0134167 A1* | 5/2018 | Kristof | B60L 53/20 |

FOREIGN PATENT DOCUMENTS

JP 2006054955 2/2006

\* cited by examiner

*Primary Examiner* — Bryan R Perez
(74) *Attorney, Agent, or Firm* — CHIP LAW GROUP

(57) ABSTRACT

Disclosed is a control circuit of a switched capacitor converter, the switched capacitor converter including a plurality of capacitors and a plurality of switching elements, the control circuit including a control unit configured to control switching of the plurality of switching elements, and a charging unit configured to charge at least some of the plurality of capacitors such that a potential difference across each of the at least some of the plurality of capacitors becomes equal to or more than a voltage lower limit set value, and the control unit being configured to start the switching after charging by the charging unit is completed.

7 Claims, 10 Drawing Sheets

CONTROL CIRCUIT, SWITCHED CAPACITOR CONVERTER, AND VEHICLE

CROSS REFERENCE TO RELATED APPLICATIONS

This US. application claims priority benefit of Japanese Patent Application No. JP 2022-078100 filed in the Japan Patent Office on May 11, 2022. Each of the above-referenced applications is hereby incorporated herein by reference in its entirety.

BACKGROUND

The disclosure described in the present specification relates to a control circuit, a switched capacitor converter, and a vehicle.

In the related art, a switched capacitor converter is used as a power supply (see Japanese Patent Laid-open No. 2006-54955, for example).

The switched capacitor converter has a configuration that includes a plurality of connection nodes between switching elements and in which capacitors are appropriately connected to and between the connection nodes. The switched capacitor converter generates an output voltage by subjecting an input voltage to direct current/direct current (DC/DC) conversion.

DETAILED DESCRIPTION

In the present specification, a metal oxide semiconductor (MOS) field-effect transistor refers to a field-effect transistor in which a gate structure includes at least the following three layers: a "layer including a conductor or a semiconductor such as polysilicon having a small resistance value," an "insulating layer," and a "P-type, N-type, or intrinsic semiconductor layer." That is, the gate structure of the MOS field-effect transistor is not limited to a three-layer structure of metal, an oxide, and a semiconductor.

In the present specification, a constant voltage refers to a fixed voltage in an ideal state. In practice, the constant voltage is a voltage that can slightly vary according to a temperature change or other factors.

In the present specification, a constant current refers to a fixed current in an ideal state. In practice, the constant current is a current that can slightly vary according to a temperature change or other factors.

<Switched Capacitor Converter (Comparative Example)>

Figure 1:
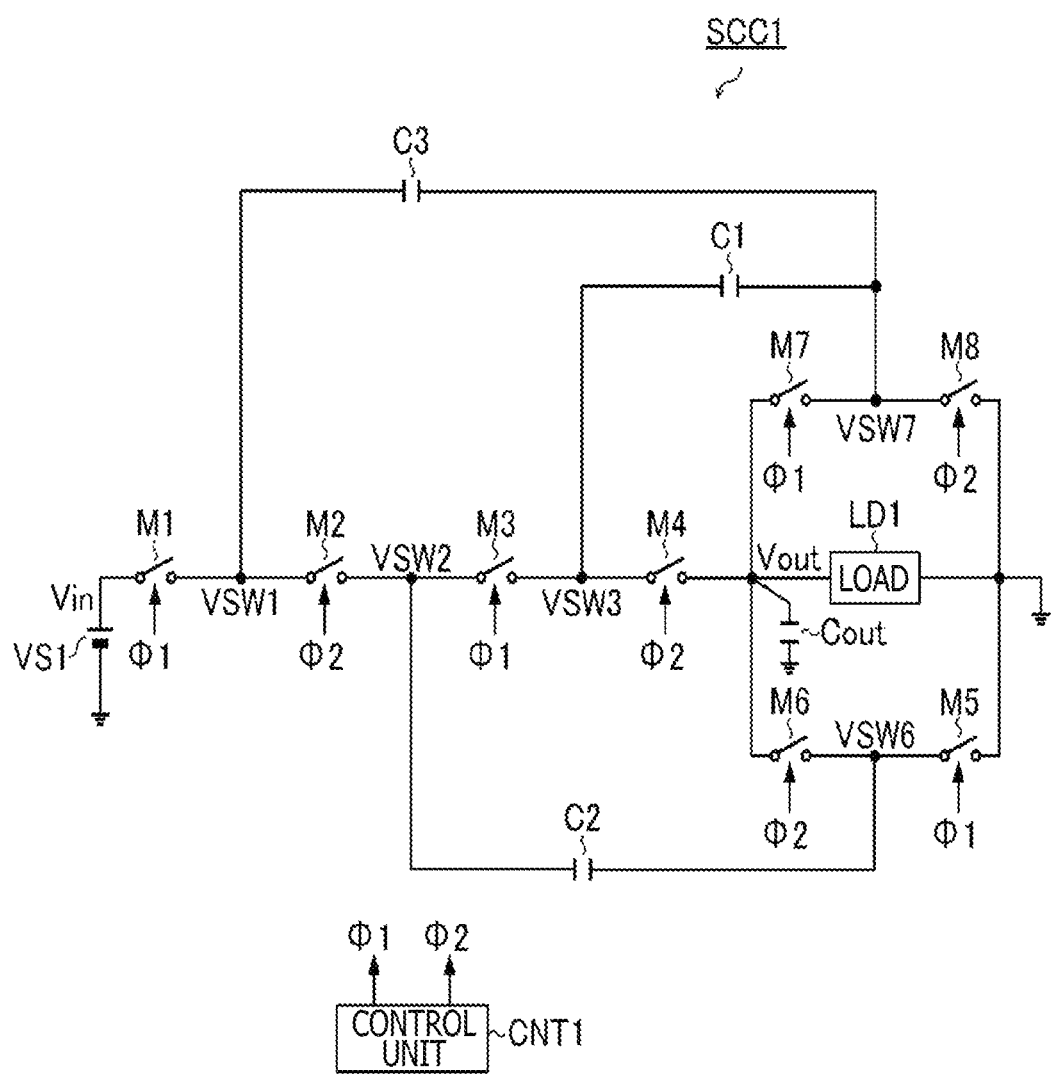
FIG. 1 is a diagram illustrating a comparative example of a switched capacitor converter.
Figure 2:
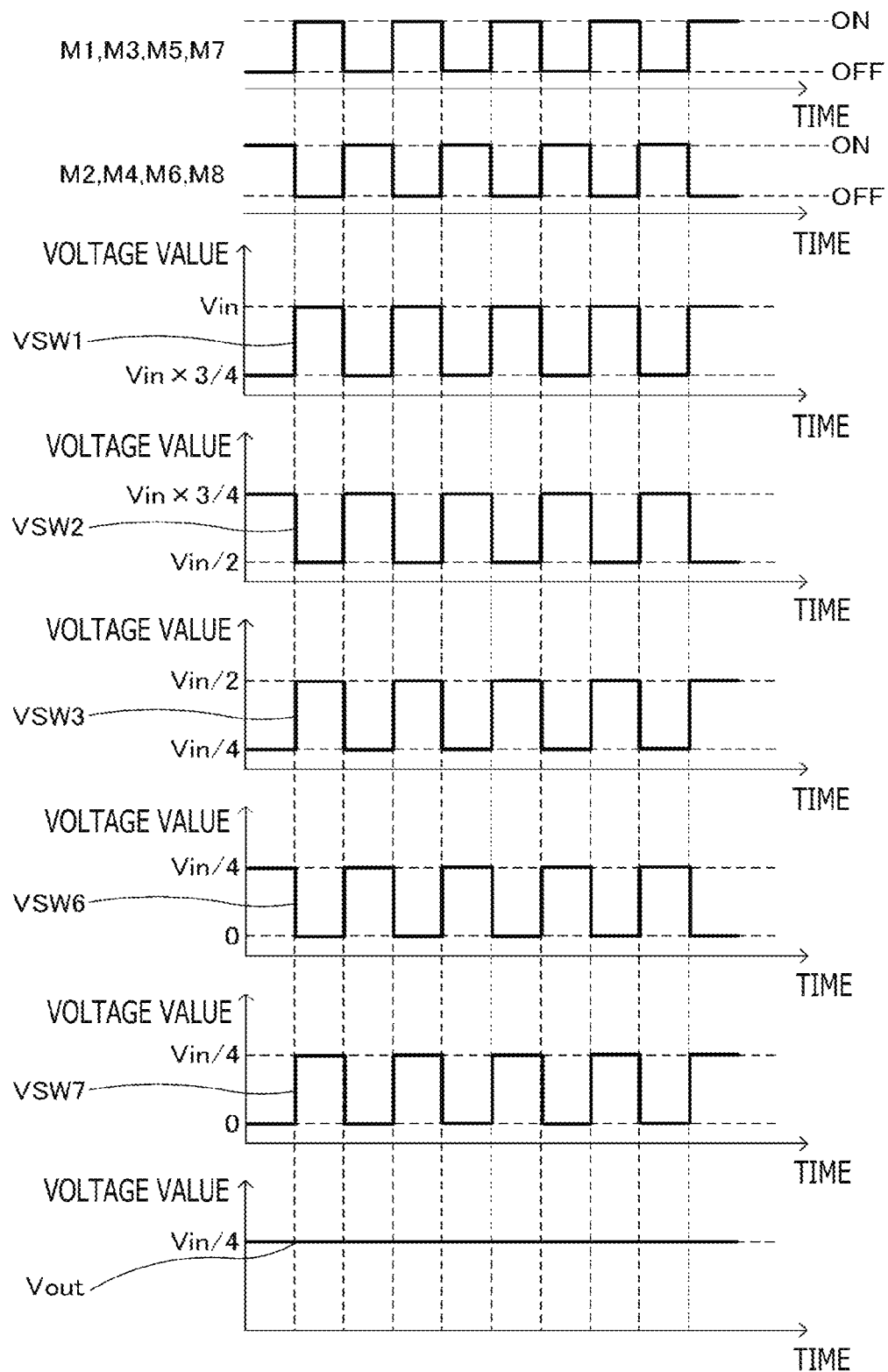
FIG. 2 is a timing diagram illustrating voltages of various parts of the switched capacitor converter illustrated in FIG. 1.

FIG. 1 is a diagram illustrating a comparative example of a switched capacitor converter (typical configuration to be compared with an embodiment to be described later). The topology of a switched capacitor converter SCC1 according to the present comparative example is a Dickson topology. FIG. 2 is a timing diagram illustrating voltages of various parts of the switched capacitor converter SCC1.

The switched capacitor converter SCC1 includes switching elements M1 to M8, capacitors C1 to C3, an output capacitor Cout, and a control unit CNT1.

A first terminal of the switching element M1 is connected to a positive electrode of a direct-current voltage source VS1. A negative electrode of the direct-current voltage source VS1 is connected to a ground potential. The direct-current voltage source VS1 supplies an input voltage Vin to the first terminal of the switching element M1.

A second terminal of the switching element M1 is connected to a first terminal of the switching element M2 and a first terminal of the capacitor C3. A second terminal of the switching element M2 is connected to a first terminal of the switching element M3 and a first terminal of the capacitor C2. A second terminal of the switching element M3 is connected to a first terminal of the switching element M4 and a first terminal of the capacitor C1.

A second terminal of the switching element M4 is connected to a first terminal of the switching element M7, a first terminal of a load LD1, a first terminal of the switching element M6, and a first terminal of the output capacitor Cout. A second terminal of the switching element M7 is connected to a first terminal of the switching element M8, a second terminal of the capacitor C1, and a second terminal of the capacitor C3. A second terminal of the switching element M6 is connected to a first terminal of the switching element M5 and a second terminal of the capacitor C2. A second terminal of the switching element M8, a second terminal of the load LD1, a second terminal of the switching element M5, and a second terminal of the output capacitor Cout are connected to the ground potential.

The control unit CNT1 controls the switching elements M1, M3, M5, and M7 by a first control signal $\Phi 1$, and controls the switching elements M2, M4, M6, and M8 by a second control signal $\Phi 2$.

The control unit CNT1 complementarily performs on/off control of the switching elements M1, M3, M5, and M7 and the switching elements M2, M4, M6, and M8.

A switching voltage VSW1 switches between a value of Vin and a value of Vin×¾. The switching voltage VSW1 occurs at a connection node N1 between the switching element M1 and the switching element M2.

A switching voltage VSW2 switches between a value of Vin×¾ and a value of Vin/2. The switching voltage VSW2 occurs at a connection node N2 between the switching element M2 and the switching element M3.

A switching voltage VSW3 switches between a value of Vin/2 and a value of Vin/4. The switching voltage VSW3 occurs at a connection node N3 between the switching element M3 and the switching element M4.

A switching voltage VSW6 switches between a value of Vin/4 and zero (ground potential). The switching voltage VSW6 occurs at a connection node between the switching element M5 and the switching element M6.

A switching voltage VSW7 switches between a value of Vin/4 and zero (ground potential). The switching voltage VSW7 occurs at a connection node between the switching element M7 and the switching element M8.

An output voltage Vout has a value of Vin/4. The output voltage Vout occurs at a connection node Nout between the switching element M4, the switching element M6, and the switching element M7. The output voltage Vout is supplied to the load LD1.

Here, consideration will be given to a case where the switched capacitor converter SCC1 is started in a state in which the capacitors C1 to C3 and the output capacitor Cout have not accumulated a charge. A large inrush current flows in the switched capacitor converter SCC1 when the direct-current voltage source VS1 raises the input voltage Vin sharply at a time of a start of the switched capacitor converter SCC1.

For example, the control unit CNT1 starts switching control of the switching elements M1 to M8 in a state in which the direct-current voltage source VS1 raises the input voltage Vin sharply from 0 V to 48 V, the capacitors C1 to C3 and the output capacitor Cout have not accumulated a charge, and the input voltage Vin has reached 48 V. In this case, when the switching elements M1, M3, M5, and M7 are turned on, an inrush current IRUSH (=48/(R_M1+R_M7)) flows through the capacitor C3 and the output capacitor Cout via the switching elements M1 and M7. In a case where a resistance value R_M1 of the switching element M1 in an on state and a resistance value R_M7 of the switching element M7 in an on state are each 0.1Ω, the inrush current IRUSH is as large as 480 A.

Because the excessive inrush current as described above may not be tolerated, the input voltage Vin is made to rise slowly from 0 to 48 V while the control unit CNT1 performs switching control of the switching elements M1 to M8. The inrush current IRUSH is thereby suppressed. As a result, the switched capacitor converter SCC1 may be unable to shorten the length of time for activation.

In view of the above-described considerations, in the following, there is proposed a novel embodiment which can make the length of time for activation shorter than in the comparative example.

<Switched Capacitor Converter (Embodiment)>

Figure 3:
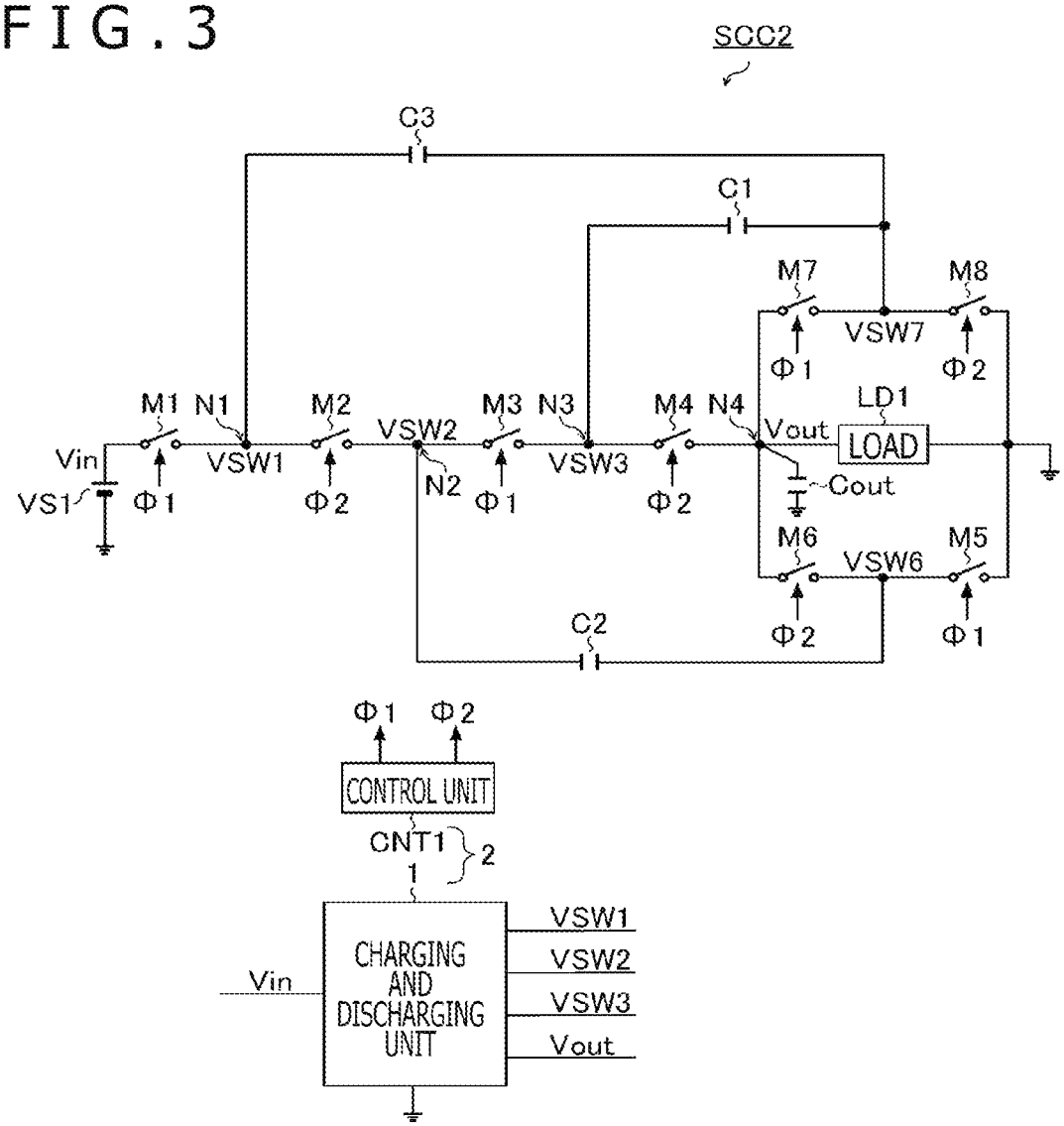
FIG. 3 is a diagram illustrating a switched capacitor converter according to an embodiment.

FIG. 3 is a diagram illustrating a switched capacitor converter according to an embodiment. A switched capacitor converter SCC2 according to the present embodiment is different from the switched capacitor converter SCC1 described above in that the switched capacitor converter SCC2 has a charging and discharging unit 1. Otherwise, the switched capacitor converter SCC2 is basically similar to the switched capacitor converter SCC1 described above.

The switched capacitor converter SCC2 has a control circuit 2. The control circuit 2 includes a control unit CNT1 and the charging and discharging unit 1.

An input voltage Vin, switching voltages VSW1 to VSW3, an output voltage Vout, and a ground potential are applied to the charging and discharging unit 1. The charging and discharging unit 1 charges or discharges the capacitors C1 to C3 and the output capacitor Cout at a time of activation of the switched capacitor converter SCC2.

Figure 4:
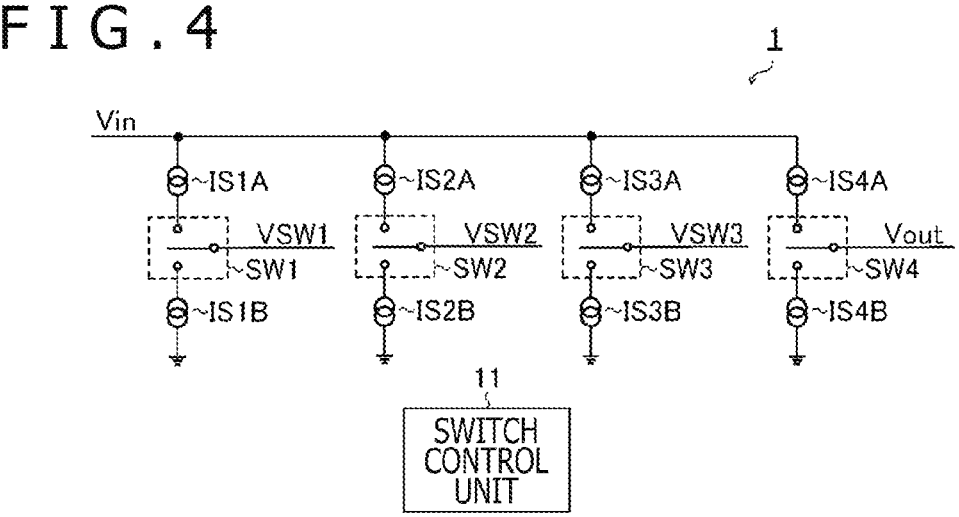
FIG. 4 is a diagram illustrating an example of a configuration of a charging and discharging unit.

FIG. 4 is a diagram illustrating an example of a configuration of the charging and discharging unit 1. The charging and discharging unit 1 in the configuration example illustrated in FIG. 4 includes constant current sources IS1A to IS4A and IS1B to IS4B, switches SW1 to SW4, and a switch control unit 11. The constant current sources IS1A to IS4A are current sources that output a first constant current. The constant current sources IS1B to IS4B are current sources that output a second constant current. The first constant current and the second constant current may have the same current value, or may have current values different from each other.

The input voltage Vin is applied to a first terminal of each of the constant current sources IS1A to IS4A. The switches SW1 to SW4 are set to one of the first to the third state by control of the switch control unit 11.

When the switch SW1 is in the first state, the switch SW1 electrically connects a second terminal of the constant current source IS1A and the connection node N1 to each other. When the switch SW1 is in the second state, the switch SW1 electrically connects a first terminal of the constant current source IS1B and the connection node N1 to each other. When the switch SW1 is in the third state, the switch SW1 electrically disconnects the second terminal of the constant current source IS1A, the first terminal of the constant current source IS1B, and the connection node N1 from one another.

When the switch SW2 is in the first state, the switch SW2 electrically connects a second terminal of the constant current source IS2A and the connection node N2 to each other. When the switch SW2 is in the second state, the switch SW2 electrically connects a first terminal of the constant current source IS2B and the connection node N2 to each other. When the switch SW2 is in the third state, the switch SW2 electrically disconnects the second terminal of the constant current source IS2A, the first terminal of the constant current source IS2B, and the connection node N2 from one another.

When the switch SW3 is in the first state, the switch SW3 electrically connects a second terminal of the constant current source IS3A and the connection node N3 to each other. When the switch SW3 is in the second state, the switch SW3 electrically connects a first terminal of the constant current source IS3B and the connection node N3 to each other. When the switch SW3 is in the third state, the switch SW3 electrically disconnects the second terminal of the constant current source IS3A, the first terminal of the constant current source IS3B, and the connection node N3 from one another.

When the switch SW4 is in the first state, the switch SW4 electrically connects a second terminal of the constant current source IS4A and a connection node N4 to each other. When the switch SW4 is in the second state, the switch SW4 electrically connects a first terminal of the constant current source IS4B and the connection node N4 to each other. When the switch SW4 is in the third state, the switch SW4 electrically disconnects the second terminal of the constant current source IS4A, the first terminal of the constant current source IS4B, and the connection node N4 from one another.

A ground potential is applied to respective second terminals of the constant current sources IS1B to IS4B.

Figure 5:
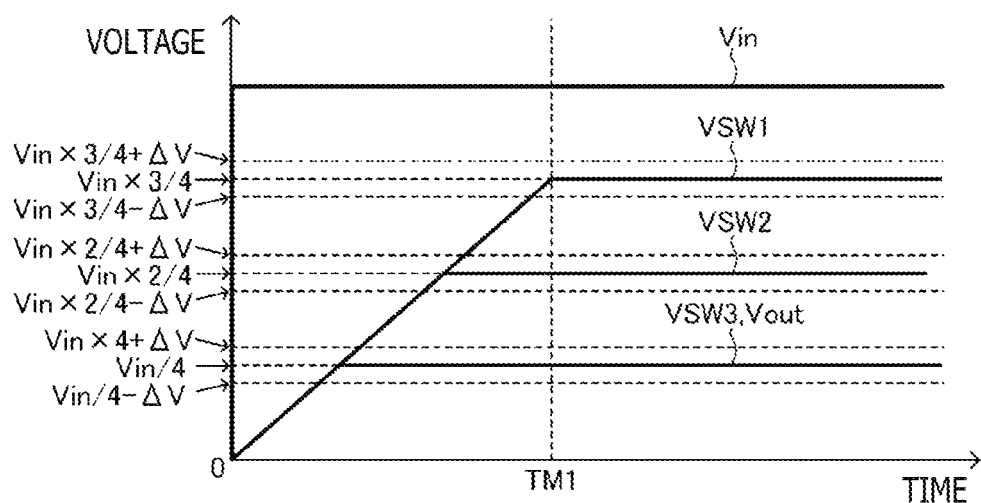
FIG. 5 is a timing diagram illustrating conditions under which no inrush current occurs at a time of a start of switching.

FIG. 5 is a timing diagram illustrating conditions under which no inrush current occurs at a time of a start of switching of the switched capacitor converter SCC2. An axis of abscissas in FIG. 5 indicates time. An axis of ordinates in FIG. 5 indicates voltage.

When activation of the switched capacitor converter SCC2 is started, the input voltage Vin sharply rises from 0 V to a predetermined value (for example, 48 V). After the input voltage Vin reaches the predetermined value, the control unit CNT1 turns on the switching elements M5 and M8, and the charging and discharging unit 1 charges the capacitors C1 to C3 and the output capacitor Cout with the first constant current. When the output voltage Vout (potential difference across the output capacitor Cout) reaches a value of Vin/4, the charging and discharging unit 1 stops charging the output capacitor Cout. When the switching voltage VSW3 (potential difference across the capacitor C1) reaches a value of Vin/4, the charging and discharging unit 1 stops charging the capacitor C1. When the switching voltage VSW2 (potential difference across the capacitor C2) reaches a value of Vin×2/4, the charging and discharging unit 1 stops charging the capacitor C2. When the switching voltage VSW1 (potential difference across the capacitor C3) reaches a value of Vin×3/4, the charging and discharging unit 1 stops charging the capacitor C3.

The control unit CNT1 starts switching control of the switching elements M1 to M8 at a timing TM1 in which the charging of all of the capacitors C1 to C3 and the output capacitor Cout is stopped. Consequently, no inrush current occurs at the time of a start of switching of the switched capacitor converter SCC2.

The timing at which the control unit CNT1 starts the switching control of the switching elements M1 to M8 preferably satisfies the following first condition, for example, when consideration is given to a fact that there are manufacturing variations in respective capacitances of the capacitors C1 to C3 and the output capacitor Cout, a fact that the inrush current does not need to be reduced to zero, a fact that there is a fear that the capacitors C1 to C3 and the output capacitor Cout may be excessively charged due to an effect of leakage currents of the switching elements M1 to M8 or other factors, and other facts.

The first condition is a condition that the output voltage Vout (potential difference across the output capacitor Cout) and the switching voltage VSW3 (potential difference across the capacitor C1) be equal to or higher than Vin/4−ΔV but equal to or lower than Vin/4+ΔV, the switching voltage VSW2 (potential difference across the capacitor C2) be equal to or higher than Vin×2/4−ΔV but equal to or lower than Vin × 2/4+ΔV, and the switching voltage VSW1 (potential difference across the capacitor C3) be equal to or higher than Vin×3/4−ΔV but equal to or lower than Vin×3/4+ΔV.

Figure 6:
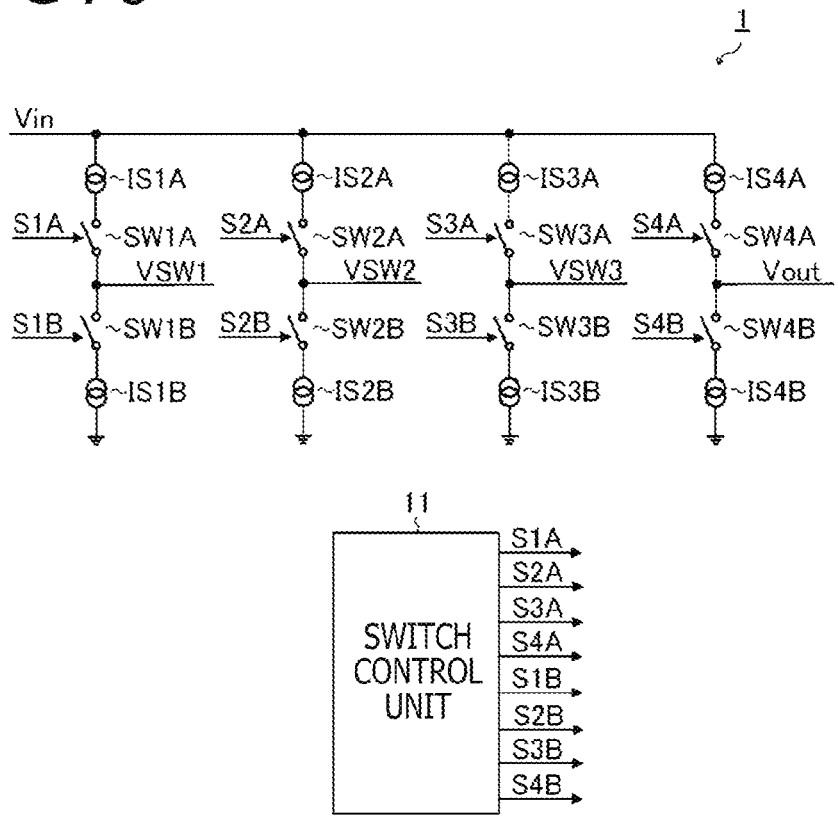
FIG. 6 is a diagram illustrating a specific example of the charging and discharging unit illustrated in FIG. 4.
Figure 7:
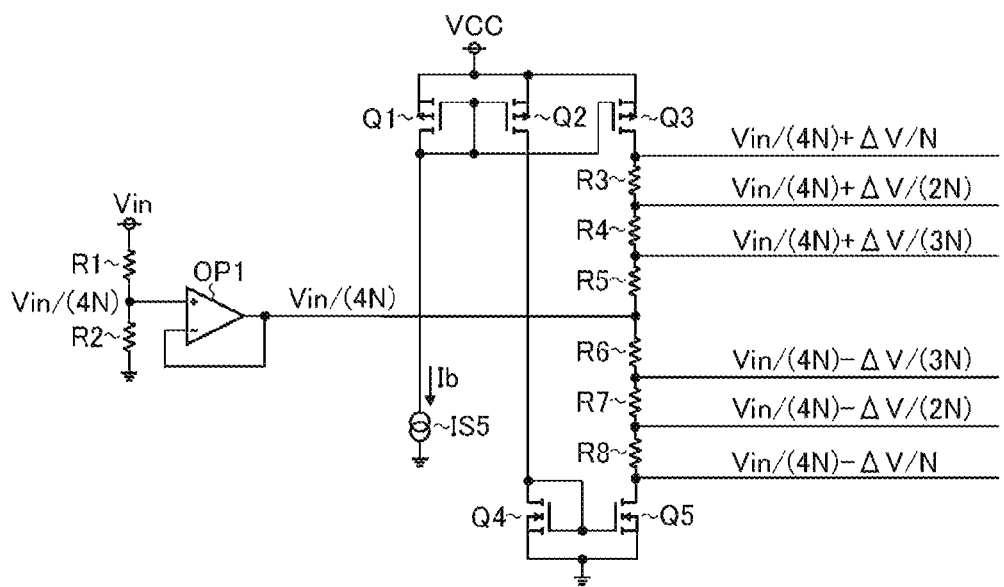
FIG. 7 is a diagram illustrating an example of a configuration of a reference voltage generating circuit.
Figure 9:
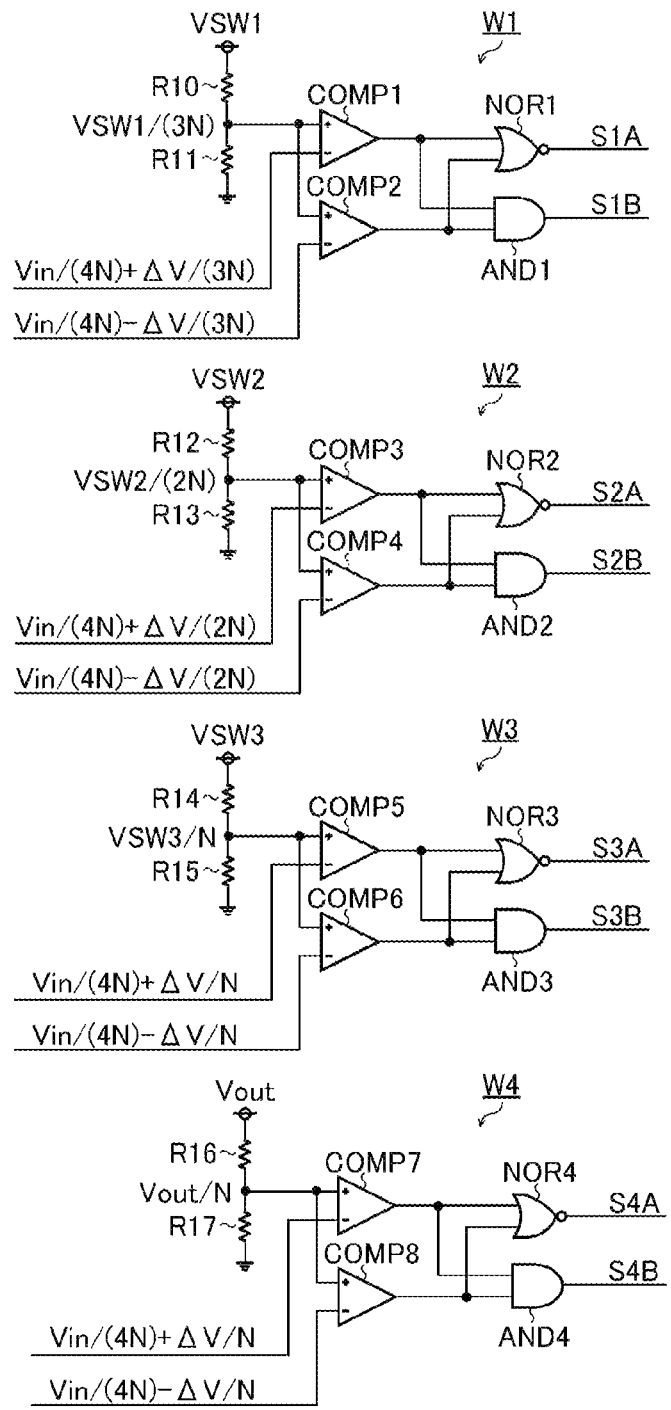
FIG. 9 is a diagram illustrating an example of a configuration of window comparators.

In order for the timing at which the control unit CNT1 starts the switching control of the switching elements M1 to M8 to satisfy the above-described first condition, it is preferable that the charging and discharging unit 1, for example, have a configuration illustrated in FIG. 6 as a specific example of the configuration illustrated in FIG. 4, and that the switch control unit 11 have a configuration including a reference voltage generating circuit illustrated in FIG. 7 and four window comparators illustrated in FIG. 9.

A switch SWkA (k is a natural number from 1 to 4 both inclusive) provided to the charging and discharging unit 1 having the configuration illustrated in FIG. 6 is on when a control signal SkA is at a HIGH level. The switch SWkA is off when the control signal SkA is at a LOW level. Similarly, a switch SWkB provided to the charging and discharging unit 1 having the configuration illustrated in FIG. 6 is on when a control signal SkB is at a HIGH level. The switch SWkB is off when the control signal SkB is at a LOW level.

The reference voltage generating circuit illustrated in FIG. 7 includes resistances R1 to R8, an operational amplifier OP1, P-channel MOS field-effect transistors Q1 to Q3, N-channel MOS field-effect transistors Q4 and Q5, and a constant current source IS5. The input voltage Vin, for example, can be used as a power supply voltage VCC of the reference voltage generating circuit illustrated in FIG. 7.

A resistance voltage dividing circuit including the resistances R1 and R2 divides the input voltage Vin, and thereby generates a voltage having a value of Vin/(4N). The value of N is adjusted by the respective resistance values of the resistances R1 and R2. The voltage having the value of Vin/(4N) which is output from the resistance voltage dividing circuit is supplied to a non-inverting input terminal of the operational amplifier OP1. An output terminal of the operational amplifier OP1 is connected to an inverting input terminal of the operational amplifier OP1. The operational amplifier OP1 thus operates as a buffer amplifier.

The voltage having the value of Vin/(4N) which is output from the operational amplifier OP1 is supplied to a series circuit of the resistances R3 to R8. Specifically, the voltage having the value of Vin/(4N) which is output from the operational amplifier OP1 is supplied to a connection node between the resistance R5 and the resistance R6.

A first current mirror circuit and a second current mirror circuit supply the series circuit of the resistances R3 to R8 with a current corresponding to a constant current Ib output from the constant current source IS5. The first current mirror circuit includes the MOS field-effect transistors Q1 to Q3. The second current mirror circuit includes the MOS field-effect transistors Q4 and Q5.

A first reference voltage having a value of Vin/(4N)+ ΔV/N is output from a connection node between the MOS field-effect transistor Q3 and the resistance R3. A second reference voltage having a value of Vin/(4N)+ΔV/(2N) is output from a connection node between the resistance R3 and the resistance R4. A third reference voltage having a value of Vin/(4N)+ΔV/(3N) is output from a connection node between the resistance R4 and the resistance R5. A fourth reference voltage having a value of Vin/(4N)−ΔV/(3N) is output from a connection node between the resistance R6 and the resistance R7. A fifth reference voltage having a value of Vin/(4N)−ΔV/(2N) is output from a connection node between the resistance R7 and the resistance R8. A sixth reference voltage having a value of Vin/(4N)−ΔV/N is output from a connection node between the resistance R8 and the MOS field-effect transistor Q5. The values of the first to third reference voltages are each a voltage upper limit set value. The values of the fourth to sixth reference voltages are each a voltage lower limit set value.

Figure 8:
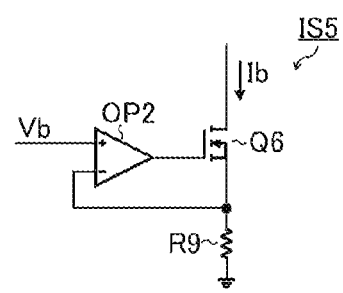
FIG. 8 is a diagram illustrating an example of a configuration of a constant current source.

Here, accuracy of the respective values of the first to sixth reference voltages can be increased by making the constant current source IS5 have a configuration illustrated in FIG. 8. The constant current source IS5 having the configuration illustrated in FIG. 8 includes an operational amplifier OP2, an N-channel MOS field-effect transistor Q6, and a resistance R9.

A constant voltage Vb is supplied to a non-inverting input terminal of the operational amplifier OP2. The constant voltage Vb is, for example, a highly accurate constant voltage such as a band gap reference voltage. An output terminal of the operational amplifier OP2 is connected to a gate of the MOS field-effect transistor Q6. An inverting input terminal of the operational amplifier OP2 is connected to a source of the MOS field-effect transistor Q6 and a first terminal of the resistance R9. A second terminal of the resistance R9 is connected to a ground potential.

The value of the constant current Ib output from the constant current source IS5 having the configuration illustrated in FIG. 8 can be expressed by the following Equation (1). Incidentally, in the following Equation (1), Ib is the value of the constant current Ib, Vb is the value of the constant voltage Vb, and R9 is the resistance value of the resistance R9.

$$Ib=Vb/R9 \qquad (1)$$

Letting R be the respective resistance values of the resistances R3 to R8, the above-described ΔV can be expressed by the following Equation (2). Hence, the accuracy of the above-described ΔV is increased by making characteristics of the resistance R9 and the resistances R3 to R8 uniform. The accuracy of the respective values of the first to sixth reference voltages is consequently increased. Incidentally, the characteristics of the resistance R9 and the resistances R3 to R8 can be made uniform by forming the resistance R9 and the resistances R3 to R8 in the same manufacturing process, for example.

$$\Delta V=Vb\times R/R9 \qquad (2)$$

The four window comparators Wk (k is a natural number from 1 to 4 both inclusive) illustrated in FIG. 9 output control signals SkA and SkB.

The window comparator W1 includes resistances R10 and R11, comparators COMP1 and COMP2, a NOR gate NOR1, and an AND gate AND1.

The window comparator W2 includes resistances R12 and R13, comparators COMP3 and COMP4, a NOR gate NOR2, and an AND gate AND2.

The window comparator W3 includes resistances R14 and R15, comparators COMP5 and COMP6, a NOR gate NOR3, and an AND gate AND3.

The window comparator W4 includes resistances R16 and R17, comparators COMP7 and COMP8, a NOR gate NOR4, and an AND gate AND4.

The four window comparators W1 to W4 have the basically similar circuit configuration. Accordingly, in the following, the circuit configuration of the window comparator W1 will representatively be described.

A resistance voltage dividing circuit including the resistances R10 and R11 divides the input voltage VSW1, and thereby generates a voltage having a value of VSW1/(3N). The value of N is adjusted by the respective resistance values of the resistances R10 and R11. The voltage having the value of VSW1/(3N) which voltage is output from the resistance voltage dividing circuit is supplied to respective non-inverting input terminals of the comparators COMP1 and COMP2. An inverting input terminal of the comparator COMP1 is supplied with the third reference voltage having the value of Vin/(4N)+ΔV/(3N). An inverting input terminal of the comparator COMP2 is supplied with the fourth reference voltage having the value of Vin/(4N)−ΔV/(3N).

The NOR gate NOR1 outputs a control signal S1A as a NOR of an output of the comparator COMP1 and an output of the comparator COMP2.

The AND gate AND1 outputs a control signal S1B as an AND of the output of the comparator COMP1 and the output of the comparator COMP2.

Examples of Application

Figure 10:
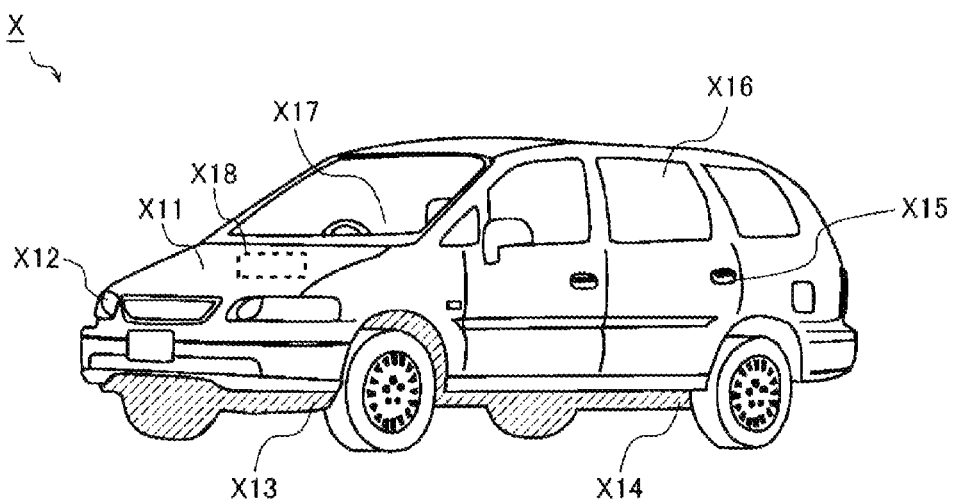
FIG. 10 is an external view of a vehicle.
Figure 11:
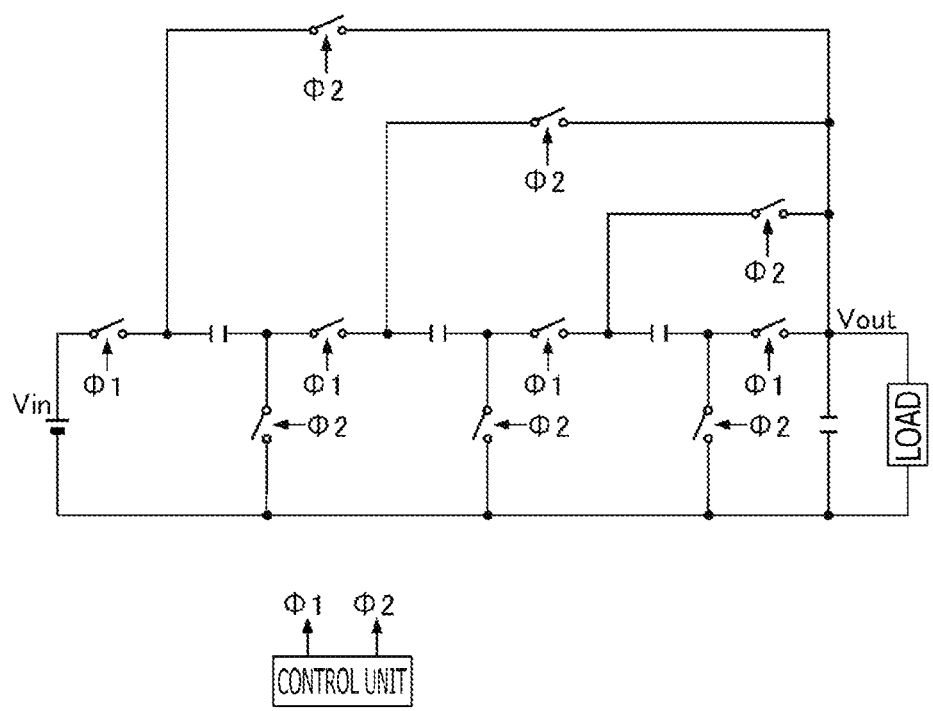
FIG. 11 is a diagram illustrating a first example of a switched capacitor converter having a topology different from a Dickson topology.
Figure 12:
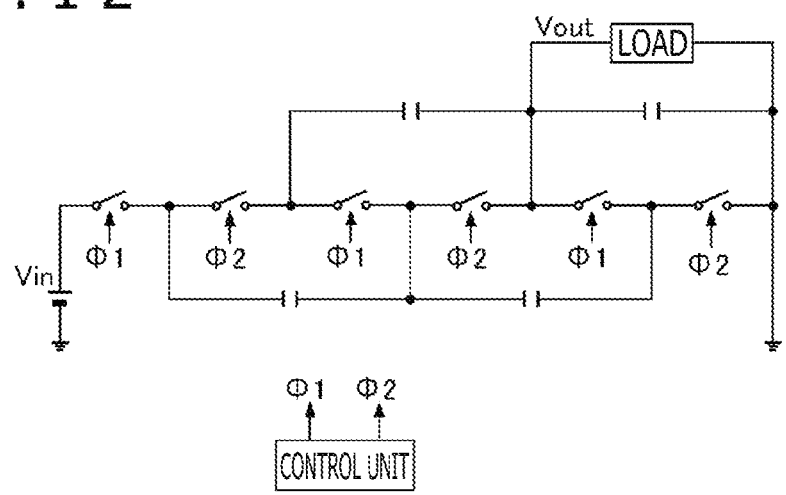
FIG. 12 is a diagram illustrating a second example of a switched capacitor converter having a topology different from the Dickson topology.
Figure 13:
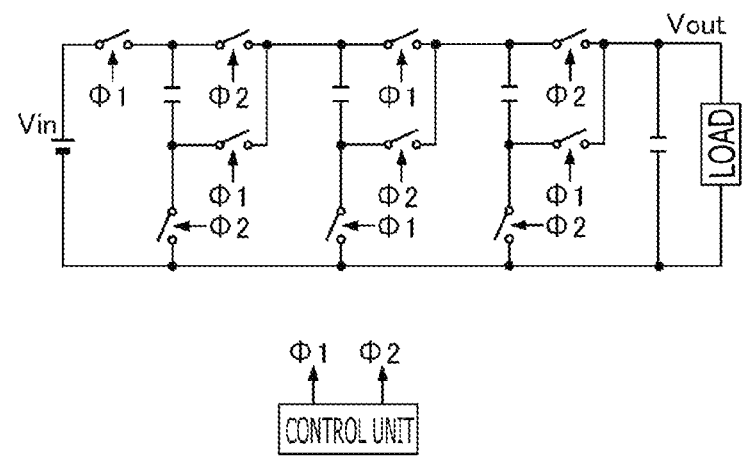
FIG. 13 is a diagram illustrating a third example of a switched capacitor converter having a topology different from the Dickson topology.
Figure 14:
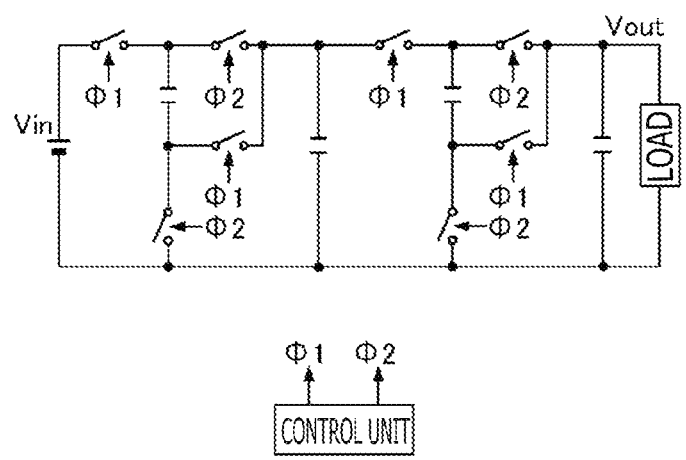
FIG. 14 is a diagram illustrating a fourth example of a switched capacitor converter having a topology different from the Dickson topology.

FIG. 10 is an external view of a vehicle X. The vehicle X in the present configuration example is mounted with various electronic apparatuses X11 to X18 that operate by being supplied with a voltage output from an unillustrated battery. It is to be noted that mounting positions of the electronic apparatuses X11 to X18 in the present figure may be different from actual mounting positions for the convenience of illustration.

The electronic apparatus X11 represents an engine control unit that performs control related to an engine (injection control, electronic throttle control, idling control, oxygen sensor heater control, auto-cruise control, and other control).

The electronic apparatus X12 represents a lamp control unit that performs on/off control on a high intensity discharged lamp [HID], a daytime running lamp [DRL], and other lamps.

The electronic apparatus X13 represents a transmission control unit that performs control related to a transmission.

The electronic apparatus X14 represents a braking unit that performs control related to motion of the vehicle X (anti-lock brake system [ABS] control, electric power steering [EPS] control, electronic suspension control, and other control).

The electronic apparatus X15 represents a security control unit that performs driving control on door locks, a crime prevention alarm, and other components.

The electronic apparatus X16 represents electronic apparatuses incorporated in the vehicle X in a stage of factory shipment as standard equipment items or manufacturer option items, such as windshield wipers, electrically operated door mirrors, power windows, dampers (shock absorbers), an electrically operated sunroof, and electrically operated seats.

The electronic apparatus X17 represents electronic apparatuses optionally mounted in the vehicle X as user option items such as a vehicle-mounted audio/visual [A/V] apparatus, a car navigation system, and an electronic toll collection system [ETC].

The electronic apparatus X18 represents electronic apparatuses provided with a high withstand voltage motor, such as a vehicle-mounted blower, an oil pump, a water pump, and a battery cooling fan.

It is to be noted that the switched capacitor converter SCC2 described earlier can be incorporated in any of the electronic apparatuses X11 to X18. In addition, applications of the switched capacitor converter SCC2 described earlier are not limited to a power supply mounted in the vehicle X, and may be a power supply mounted in an industrial apparatus, for example.

<Others>

In addition to the foregoing embodiment, various changes can be made to the configuration of the disclosure without departing from the spirit of the disclosure. It is to be recognized that the foregoing embodiment is illustrative in all respects, and is not restrictive. It is to be understood that the technical scope of the present disclosure is represented by claims rather than the description of the foregoing embodiment, and includes all changes belonging to meanings and a scope equivalent to the claims.

For example, in the switched capacitor converter SCC2, the dispositions of the direct-current voltage source VS1 and the load LD1 may be interchanged. In a case where the dispositions of the direct-current voltage source VS1 and the load LD1 are interchanged, the voltage supplied from the switched capacitor converter SCC2 to the load LD1 (output voltage of the switched capacitor converter SCC2) is higher than the voltage supplied from the direct-current voltage source VS1 to the switched capacitor converter SCC2 (input voltage of the switched capacitor converter SCC2).

The control circuit 2 described above can be applied also to switched capacitor converters having topologies different from the Dickson topology. The switched capacitor converters having topologies different from the Dickson topology include, for example, switched capacitor converters illustrated in FIGS. 11 to 14.

The control circuit 2 described above has a configuration including the charging and discharging unit 1. However, the control circuit 2 may have a configuration including a charging unit in place of the charging and discharging unit 1. That is, the control circuit 2 may have a configuration not including a discharging unit.

The control circuit 2 described above is able to charge or discharge all of the capacitors C1 to C3 of the switched capacitor converter SCC2 before the switching of the switching elements M1 to M8. However, the control circuit 2 may be able to charge or discharge some of the capacitors C1 to C3 of the switched capacitor converter SCC2 before the switching of the switching elements M1 to M8. Even in the case where some of the capacitors C1 to C3 can be charged or discharged, a length of time for activation of the switched capacitor converter SCC2 can be shortened, though the effect is reduced as compared with the case where all of the capacitors C1 to C3 can be charged or discharged.

The control circuit (2) described above is a control circuit of a switched capacitor converter (SCC2), the switched capacitor converter (SCC2) including a plurality of capacitors (C1 to C3) and a plurality of switching elements (M1 to M8), the control circuit having a configuration (first configuration) including a control unit (CNT1) configured to control switching of the plurality of switching elements, and a charging unit (1) configured to charge at least some of the plurality of capacitors such that a potential difference across each of the at least some of the plurality of capacitors becomes equal to or more than a voltage lower limit set value, the control unit being configured to start the switching after charging by the charging unit is completed.

The control circuit having the above-described first configuration can shorten the length of time for activation of the switched capacitor converter.

In the control circuit having the above-described first configuration, there may be adopted a configuration (second configuration) in which the charging unit is configured to start the charging after one terminal of each of the at least some of the plurality of capacitors and a ground potential are electrically connected to each other.

The control circuit having the above-described second configuration can reliably charge at least some of the plurality of capacitors.

In the control circuit having the above-described first or second configuration, there may be adopted a configuration (third configuration) in which the charging unit is configured to perform the charging with a first constant current.

The control circuit having the above-described third configuration easily limits an inrush current at a time of the charging.

In the control circuit having one of the above-described first to third configurations, there may be adopted a configuration (fourth configuration) in which the control circuit includes a discharging unit (1) configured to discharge each of the at least some of the plurality of capacitors such that the potential difference across each of the at least some of the plurality of capacitors becomes equal to or less than a voltage upper limit set value.

The control circuit having the above-described fourth configuration can resolve a state in which at least some of the plurality of capacitors are excessively charged due to an effect of leakage currents of the switching elements.

In the control circuit having the above-described fourth configuration, there may be adopted a configuration (fifth configuration) in which the discharging unit is configured to perform discharging with a second constant current.

The control circuit having the above-described fifth configuration easily limits an inrush current at a time of the discharging.

In the control circuit having the above-described first to fifth configurations, there may be adopted a configuration (sixth configuration) in which the control circuit includes a constant current source (IS5) that includes a first resistance (R9) and that is configured to apply a constant voltage to the first resistance and output a third constant current flowing through the first resistance, and a second resistance (R6 to R8) configured to be supplied with a current corresponding to the third constant current, in which the voltage lower limit set value is determined by a voltage output from a terminal portion of the second resistance.

When characteristics of the first resistance and the second resistance are made uniform, the control circuit having the above-described sixth configuration can increase accuracy of the voltage lower limit set value.

The switched capacitor converter (SCC2) described above has a configuration (seventh configuration) including the control circuit having one of the above-described first to sixth configurations, the plurality of capacitors, and the plurality of switching elements.

The switched capacitor converter having the above-described seventh configuration can shorten a length of time for activation.

The vehicle (X) described above has a configuration (eighth configuration) including the switched capacitor converter having the above-described seventh configuration.

The vehicle having the above-described eighth configuration can shorten the length of time for activation of the switched capacitor converter.

According to the disclosure described in the present specification, it is possible to shorten a length of time for activation of the switched capacitor converter.

What is claimed is:

1. A control circuit of a switched capacitor converter, the switched capacitor converter including a plurality of capacitors and a plurality of switching elements, the control circuit comprising:
   a control unit configured to control switching of the plurality of switching elements;
   a charging unit configured to charge at least some of the plurality of capacitors such that a potential difference across each of the at least some of the plurality of capacitors becomes equal to or more than a voltage lower limit set value, wherein
      the charging unit includes a plurality of switches and a switch control unit, and
      the switch control unit is configured to control the plurality of switches to set to one of a plurality of states; and
   a discharging unit configured to discharge each of the at least some of the plurality of capacitors such that the potential difference across each of the at least some of the plurality of capacitors becomes equal to or less than a voltage upper limit set value, wherein
      the control unit being configured to start the switching control at a timing in which the charging by the charging unit is stopped.

2. The control circuit according to claim 1, wherein the charging unit is configured to start the charging after one terminal of each of the at least some of the plurality of capacitors and a ground potential are electrically connected to each other.

3. The control circuit according to claim 1, wherein the charging unit is configured to perform the charging with a first constant current.

4. The control circuit according to claim 1, wherein the discharging unit is configured to perform the discharging with a second constant current.

5. The control circuit according to claim 1, further comprising:
- a constant current source that includes a first resistance, wherein the constant current source is configured to apply a constant voltage to the first resistance and output a third constant current flowing through the first resistance; and
- a second resistance configured to be supplied with a current corresponding to the third constant current, wherein the voltage lower limit set value is determined by a voltage output from a terminal portion of the second resistance.

6. The switched capacitor converter comprising:
the control circuit according to claim 1;
the plurality of capacitors; and
the plurality of switching elements.

7. A vehicle comprising:
the switched capacitor converter according to claim 6.

* * * * *